US006902159B2

(12) United States Patent
Sawdon et al.

(10) Patent No.: US 6,902,159 B2
(45) Date of Patent: Jun. 7, 2005

(54) SEALED PIN LOCATING AND CLAMPING APPARATUS

(75) Inventors: Edwin G. Sawdon, St. Clair, MI (US); Brian D. Petit, Algonac, MI (US)

(73) Assignee: BTM Corporation, Marysville, MI (US)

( * ) Notice: Subject to any disclaimer, the term of this patent is extended or adjusted under 35 U.S.C. 154(b) by 47 days.

(21) Appl. No.: 10/646,517

(22) Filed: Aug. 21, 2003

(65) Prior Publication Data

US 2005/0040578 A1 Feb. 24, 2005

(51) Int. Cl.[7] .................................................. B23Q 3/08

(52) U.S. Cl. ............................. 269/32; 269/49; 269/47; 269/24

(58) Field of Search .............................. 269/32, 49, 20, 269/91–95, 228, 24, 237, 233

(56) References Cited

U.S. PATENT DOCUMENTS

| | | | |
|---|---|---|---|
| 5,165,670 A | 11/1992 | Sawdon | |
| 5,190,334 A | 3/1993 | Sawdon | |
| 5,853,211 A | 12/1998 | Sawdon et al. | |
| 5,871,250 A | 2/1999 | Sawdon | |
| 5,884,903 A | 3/1999 | Sawdon | |
| 6,364,300 B1 * | 4/2002 | Kita | 269/32 |
| 6,378,855 B1 | 4/2002 | Sawdon et al. | |
| 6,439,560 B2 * | 8/2002 | Sawada et al. | 269/32 |
| 6,502,880 B1 | 1/2003 | Sawdon | |
| 6,786,478 B2 * | 9/2004 | Pavlik et al. | 269/49 |

* cited by examiner

*Primary Examiner*—Lee D. Wilson
(74) *Attorney, Agent, or Firm*—Harness, Dickey & Pierce, P.L.C.

(57) ABSTRACT

A sealed pin locating and clamping apparatus includes a body, an actuator moveably supported by the body, a pin mounted to the body and a clamping member drivingly coupled to the actuator. The actuator includes a first rod having an internal cavity and a second rod rotatably positioned within the internal cavity. A portion of the pin is positioned within a cam slot formed in the second rod and the second rod rotates in response to linear movement of the first rod to position the clamping member.

23 Claims, 6 Drawing Sheets

SEALED PIN LOCATING AND CLAMPING APPARATUS

BACKGROUND AND SUMMARY OF THE INVENTION

The present invention relates generally to a clamp and, more particularly, to a fluid powered, sealed pin locating and clamping apparatus.

Powered clamps have been commonly used to secure workpieces, such as sheet metal automotive body panels, polymeric parts and the like in checking fixtures, gauging stations, welding station, punching stations and other locations within a manufacturing environment. Many existing clamps are powered by hydraulic or pneumatic fluid pressure. For example, reference should be made to the following U.S. Patents, which have been invented by Sawdon: U.S. Pat. No. 6,502,880 entitled "Pin Part Locator" which issued on Jan. 7, 2003; U.S. Pat. No. 6,378,855 entitled "Locking Pin Clamp" which issued on Apr. 30, 2002; U.S. Pat. No. 5,190,330 entitled "Powered Clamp with Parallel Jaws" which issued on Mar. 2, 1993; all of which are incorporated by reference herein.

It is desirable to prevent a clamping arm from opening and releasing the workpiece if there is a loss of fluid pressure. Prior constructions employing such a feature are disclosed in U.S. Pat. No. 5,871,250 entitled "Sealed Straight Line Gripper" which issued to Sawdon on Feb. 16, 1999 and U.S. Pat. No. 5,853,211 entitled "Universal Gripper" which issued to Sawdon et al. on Dec. 29, 1998. These patents are also incorporated by reference herein.

In accordance with the present invention, a sealed pin locating and clamping apparatus includes a body, an actuator moveably supported by the body, a pin mounted to the body and a clamping member drivingly coupled to the actuator. The actuator includes a first rod having an internal cavity and a second rod rotatably positioned within the internal cavity. A portion of the pin is positioned within a cam slot formed in the second rod. The clamping member is drivingly coupled to the actuator such that the second rod rotates in response to linear movement of the first rod to position the clamping member.

The sealed pin locating and clamping apparatus of the present invention is highly advantageous over traditional clamps in that the clamp includes a clamping member contained within a precise slot of a locating pin. The clamping member is moveable in response to the application of pressurized fluid to a sealed chamber. This design eliminates exposing the inner mechanism to contamination such as weld flash, metal shavings or coatings on the metal which may rub off when parts are loaded over the pin locator clamp. Additionally, the clamping member is rotatable from a position inside the pin to a position outside the pin such that the workpiece may be freely positioned over the pin when the clamping member is retracted and firmly held in place when the clamping member is extended.

In addition, the present invention optionally includes a self-locking mechanism which does not allow the clamping mechanism to retract if fluid actuation pressure is lost.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
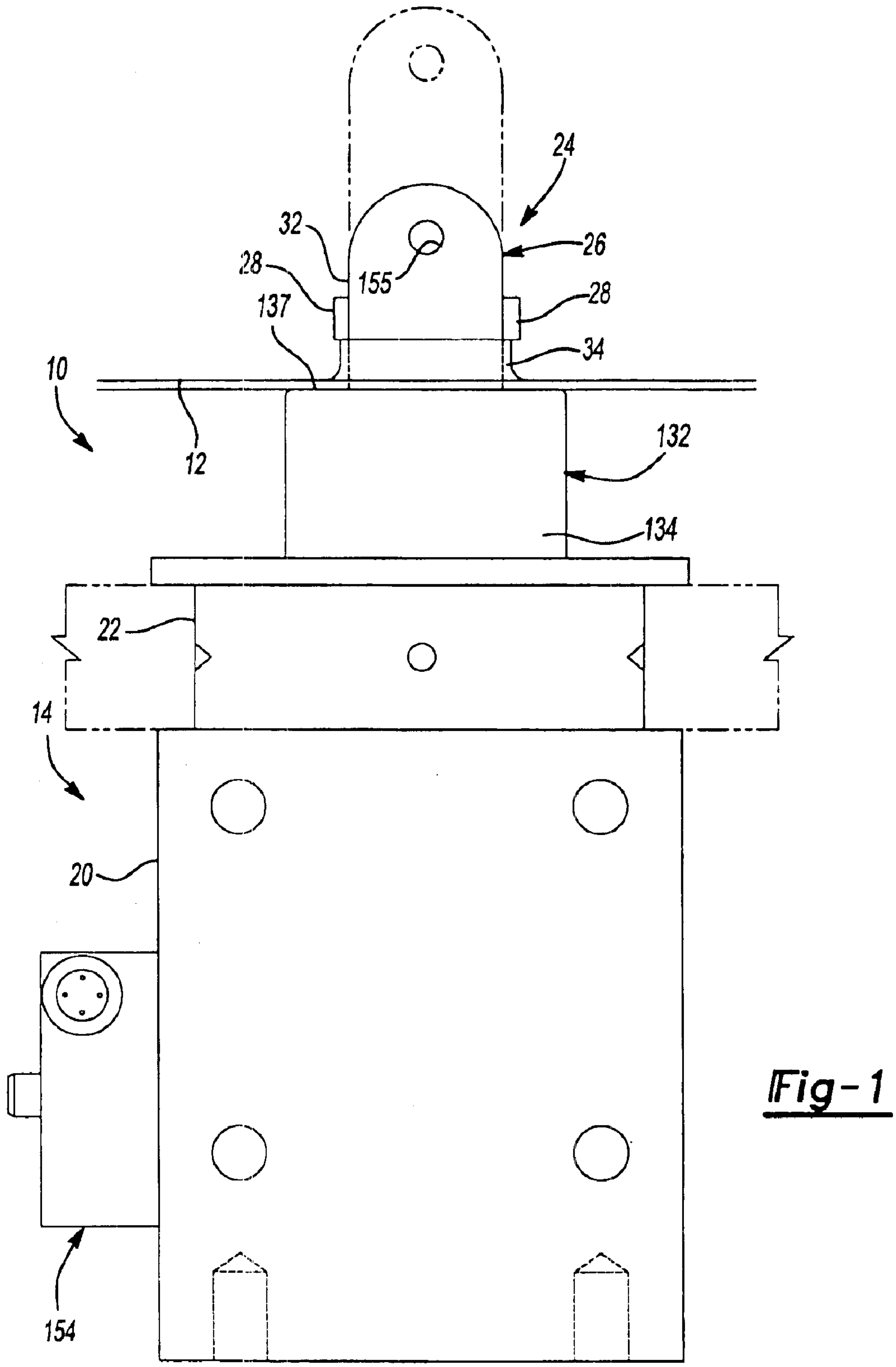
FIG. 1 is a side elevational view showing a sealed pin locating and clamping apparatus constructed in accordance with the teachings of the present invention.
Figure 2:
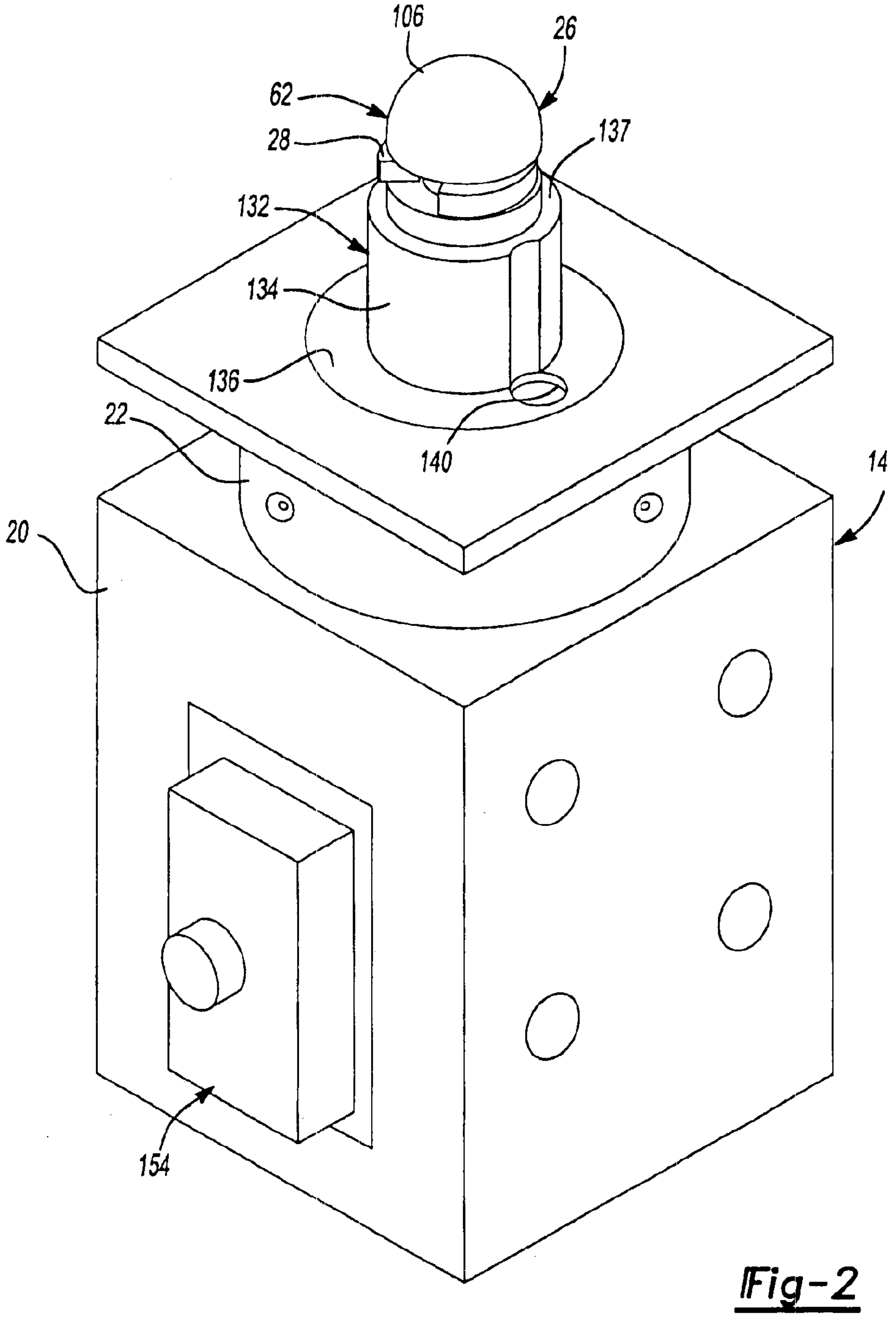
FIG. 2 is a perspective view of the sealed pin locating and clamping apparatus.
Figure 3:
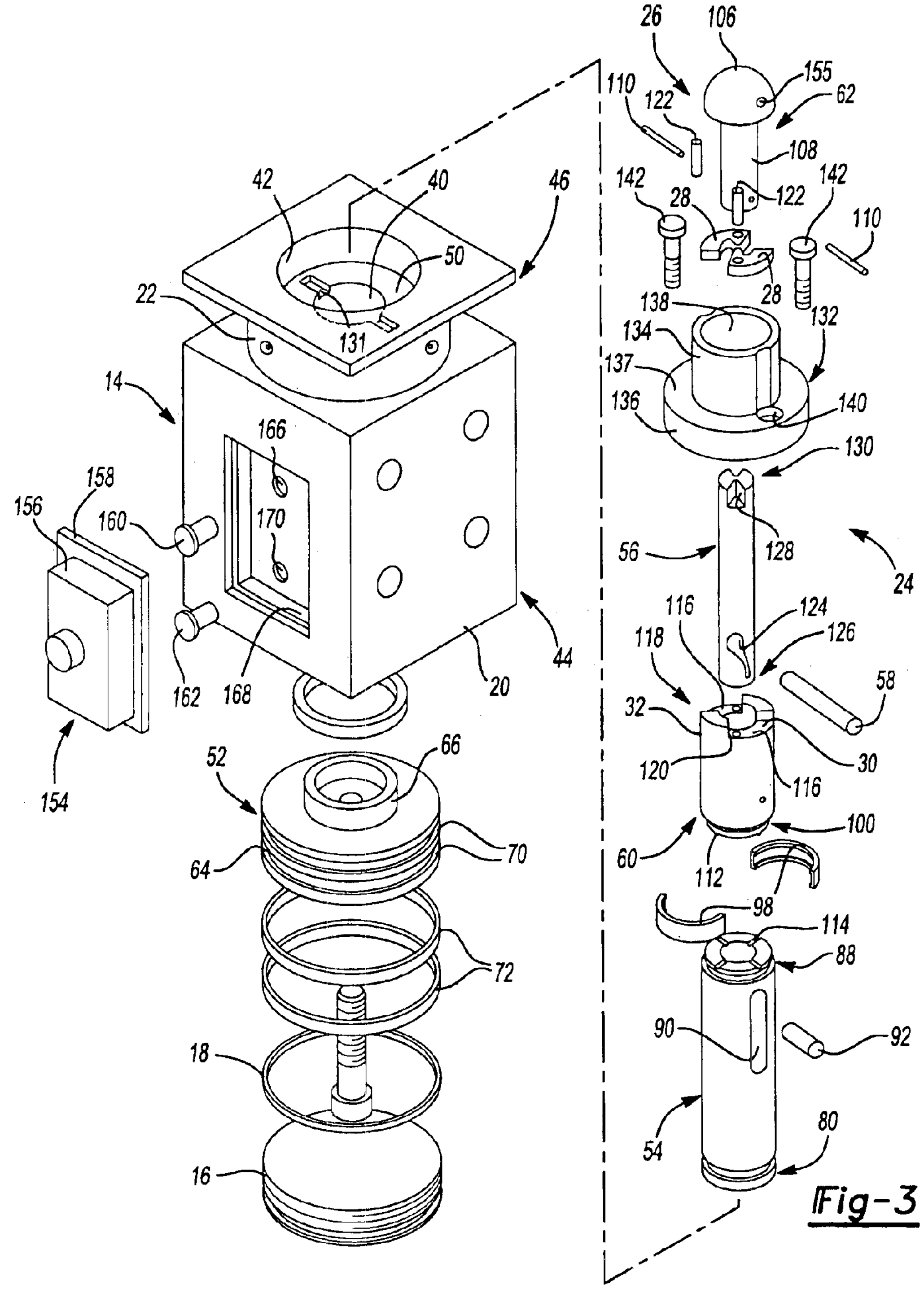
FIG. 3 is a exploded perspective view of the sealed pin locating and clamping apparatus.

The following description of the preferred embodiments is merely exemplary in nature and is in no way intended to limit the invention, its application, or uses.

Referring to FIGS. 1–7, a sealed pin locating and clamping apparatus or clamp 10 of the present invention is used to locate or gauge and then clamp a workpiece 12 in a work station such as a moving assembly line, in a start-stop manufacturing station or in an off-line work cell. A clamp body 14 is coupled to a base 16 which in turn may be mounted to a table or attached to an end effector secured to a robotic arm. A seal 18 is positioned between body 14 and base 16. Clamp body 14 includes a rectangular section 20 and a cylindrical section 22. Rectangular section 20 of body 14 is preferably machined with a NAAMS hole pattern on one or more sides. The bottom of body 14 also includes a hole pattern to aid in mounting pin clamp 10. Furthermore, cylindrical section 22 may be used to mount clamp 10 if so desired. In use, workpiece 12 may be moved relative to a stationarily mounted clamp 10 or clamp 10 may be moved relative to a stationarily mounted workpiece.

Figure 4:
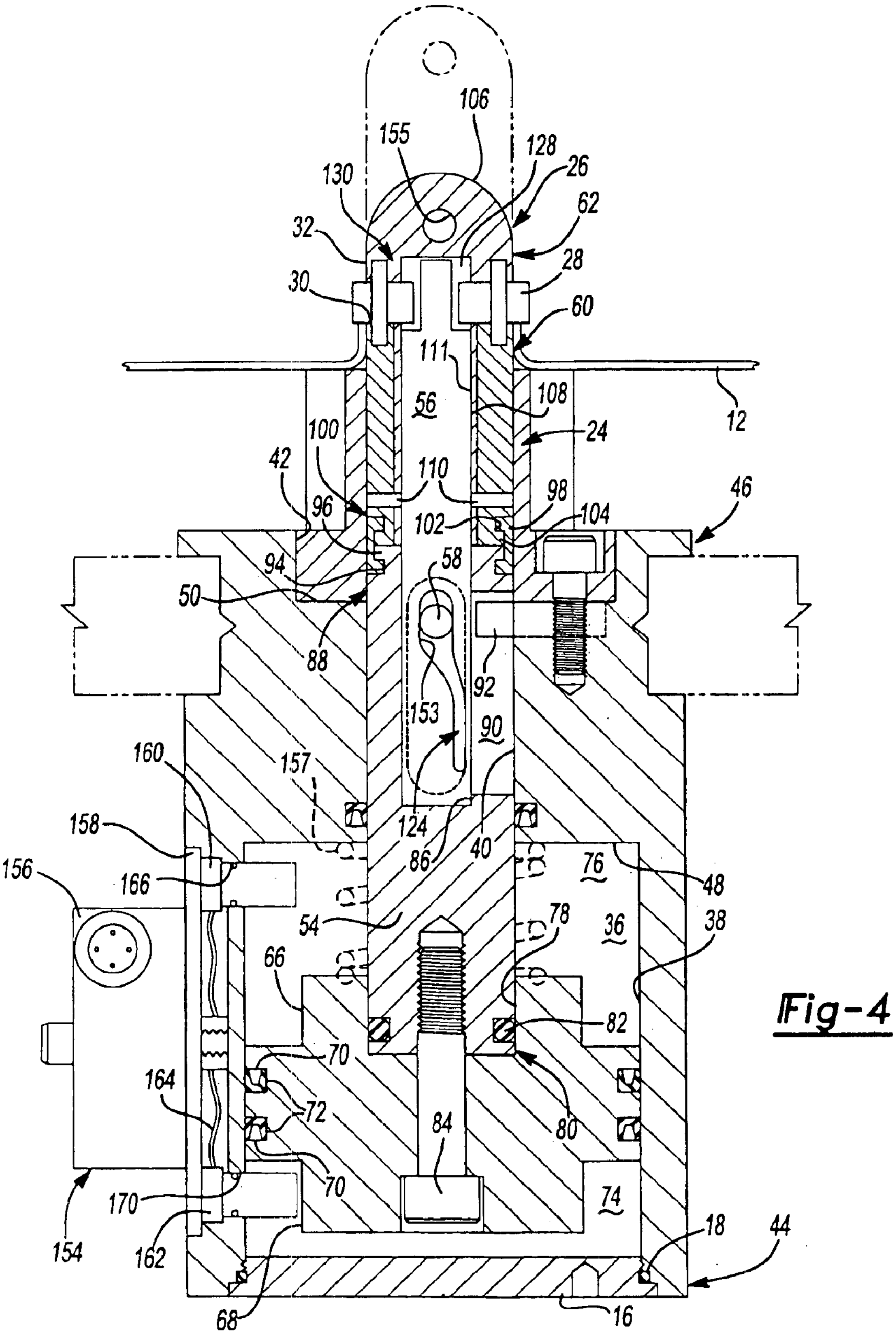
FIG. 4 is a side view cross-sectional view of the sealed pin locator clamp having a clamping member in an extended position.
Figure 5:
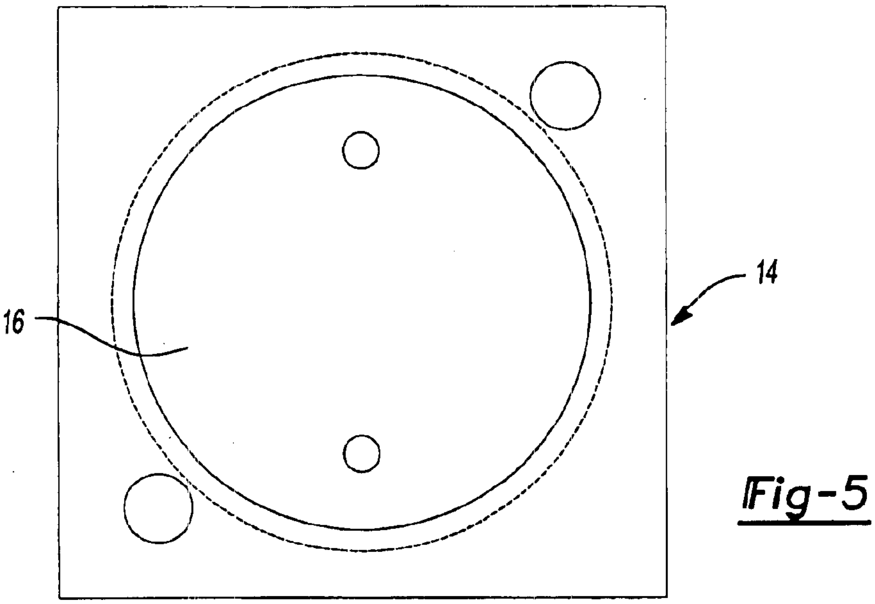
FIG. 5 is a bottom view of the sealed pin locator clamp.
Figure 6:
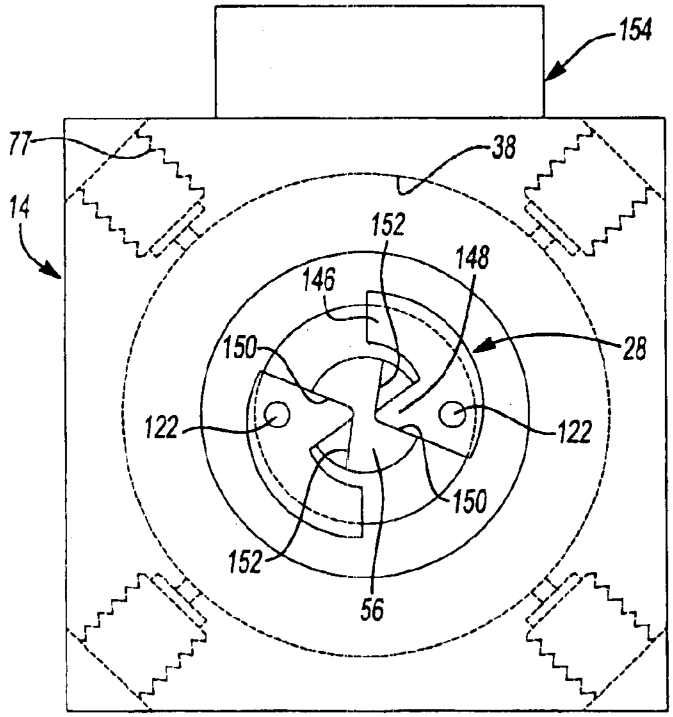
FIG. 6 is a partial top view depicting the location of the clamping members when in the extended position.

Clamp 10 includes an actuator assembly 24 having a moveable locating pin assembly 26. A pair of selectively radially extendable clamping members 28 are positioned within slots 30 extending through locating pin assembly 26. Clamping members 28 are selectively moveable in a radial direction between a first position where clamping members 28 are positioned substantially entirely within slots 30 and a second position where clamping members 28 extend at least partially from slots 30 beyond an external surface 32 of locating pin assembly 26. As will be described in greater detail hereinafter, clamping members 28 are positioned in the second or extended position when actuator assembly 24 is in a retracted position as depicted in FIGS. 4 and 6. Linear motion of actuator assembly 24 from the retracted position to an extended position, causes locating pin assembly 26 to axially translate and also move clamping members 28 from the second position to the first position inside locating pin assembly 26. Accordingly, workpiece 12 may be loaded over locating pin assembly 26 when actuator assembly 24 is in the extended position and clamping members 28 are in the first position not extending beyond external surface 32. Once workpiece 12 is positioned over locating pin assembly 26, actuator assembly 24 is moved from the extended position toward the retracted position where clamping members 28 outwardly extend from external surface 32. Locating pin assembly 26 translates until clamping members 28 engage an upturned flange 34 of workpiece 12.

Body 14 includes a stepped bore 36 having a first bore portion 38, a second bore portion 40 and a third bore portion 42. First bore portion 38 is substantially cylindrical and extends inwardly from a first end 44 of body 14. Second bore portion 40 is substantially cylindrical and coaxially aligned with first bore portion 38. Third bore portion 42 extends inwardly from a second end 46 of body 14 and is also substantially coaxially aligned with first bore portion 38 and second bore portion 40. A stop face 48 is formed at the intersection of first bore portion 38 and second bore portion 40. A land 50 is formed at the intersection of second bore portion 40 and third bore portion 42.

Actuator assembly 24 includes a piston 52, a piston rod 54, a cam rod 56, a drive pin 58, a substantially hollow, cylindrically shaped, extension tube 60 and a locating pin 62. Piston 52 is a substantially cylindrical member having a body 64, a reduced size forward section 66 and a reduced size rearward section 68. A pair of annular grooves 70 are formed in an outer surface of body 64. Seals 72 are positioned within grooves 70 to define a first chamber 74 between body 64 and base 16. A second chamber 76 is formed between body 64 and stop face 48. Ports 77 communicate with first chamber 74 and second chamber 76 to facilitate the supply of pressurized fluid to translate actuator assembly 24 between the retracted and extended positions. Forward section 66 of piston 52 includes a pocket 78 in receipt of a first end 80 of piston rod 54. A seal 82 sealingly interconnects piston rod 54 and piston 52. A threaded fastener 84 mounts piston rod 54 to piston 52.

Piston rod 54 is a substantially cylindrical member including a blind bore 86 extending inwardly from a second end 88. A keyway 90 axially extends along piston rod 54 in communication with blind bore 86. A key 92 is fixed to body 14 and slidingly disposed with keyway 90 to allow axial movement of piston rod 54 relative to body 14. Key 98 may be cylindrically shaped as shown or may alternately include any number of cross-sectional shapes such as a square or rectangle. Relative rotational movement between piston rod 54 and body 14 is restricted. Second end 88 of piston rod 54 includes a necked section 94 and a radially extending flange 96.

A pair of semi-circular keepers 98 removably interconnect second end 88 of piston rod 54 with a first end 100 of extension tube 60 to define a portion slots 30. First end 100 includes a necked section 102 and radially extending flange 104 similar to piston rod 54.

Locating pin 62 includes a bulbous end 106 and a hollow sleeve 108. Hollow sleeve 108 is positioned within extension tube 60. A pair of pin retainers 110 transversely extend through one wall of extension tube 60 and hollow sleeve 108. Pin retainers 110 terminate short of cam rod 56 to allow the cam rod to rotate freely within a cavity 111 defined by hollow sleeve 108 and blind bore 86. First end 100 includes a lug 112 positioned within a slot 114 formed in second end 88 of piston rod 54. Lug 112 acts to prevent relative rotation between extension tube 60 and piston rod 54.

A pair of diametrically opposed slots 116 are formed on a second end 118 of extension tube 60. Slots 116 define a portion of slots 30. Each slot 116 includes an aperture 120 for receipt of a pin 122. Each pin 122 rotatably interconnects a clamping member 28 to extension tube 60. Pins 122 also act to couple locating pin 62 and extension tube 60.

Cam rod 56 is a substantially cylindrical member axially captured but free to rotate within cavity 111. Cam rod 56 includes a serpentine slot 124 in receipt of drive pin 58. Slot 124 is positioned proximate a first end 126. A pair of flutes 128 are formed at a second end 130 of cam rod 56. It should be appreciate that drive pin 58 is positioned within a slot 131 and is trapped between body 14 and a support 132. Accordingly, drive pin 58 does not rotate or translate in conjunction with actuator assembly 24. As actuator assembly 24 translates drive pin 58 travels within slot 124 and causes cam rod 56 to rotate.

Support 132 is coupled to body 14 and at least partially encompasses actuator assembly 24. Specifically, support 132 includes a substantially cylindrical body 134 and a radially extending flange 136. Support 132 is positioned within third bore portion 42. Flange 136 is supported on land 50. Support 132 includes a clamping surface 137 where at least a portion of workpiece 12 is supported. One skilled in the art will appreciate that the length of body 134 may be varied to account for packaging concerns within the work cell or the geometry of workpiece 12. The length of extension tube 60 may be accordingly varied to construct a properly proportioned clamp 10. An aperture 138 extends axially through body 134 and flange 136. A pair of fastener apertures 140 extend through flange 136. Aperture 138 is sized to guide actuator assembly 24 but allow relative movement of actuator assembly 24 to support 132. This slip-fit interconnection also serves to maintain the location of keepers 98 during operation. A pair of fasteners 142 fix support 132 to body 14.

Based on the construction previously described a serviceable subassembly is defined to include locating pin 62, extension tube 60, clamping members 28, pin retainers 110 and pins 122. During operation of clamp 10, bulbous end 106 may become worn or damaged thus requiring replacement. Similarly, clamping members 28 may become worn. The subassembly may be replaced by removing fasteners 142 and the coupling support 132 from body 14. With support 132 removed, access to keepers 98 is provided. Upon removal of keepers 98, the subassembly may be replaced without further disassembly of clamp 10. The new subassembly is simply aligned with piston rod 54 while keepers 98 interconnect the replacement subassembly with piston rod 54. Support 132 is axially positioned over keepers 98 and the remainder of actuator assembly 24. Once fasteners 142 have been reinstalled, clamp 10 is operable again.

Figure 7:
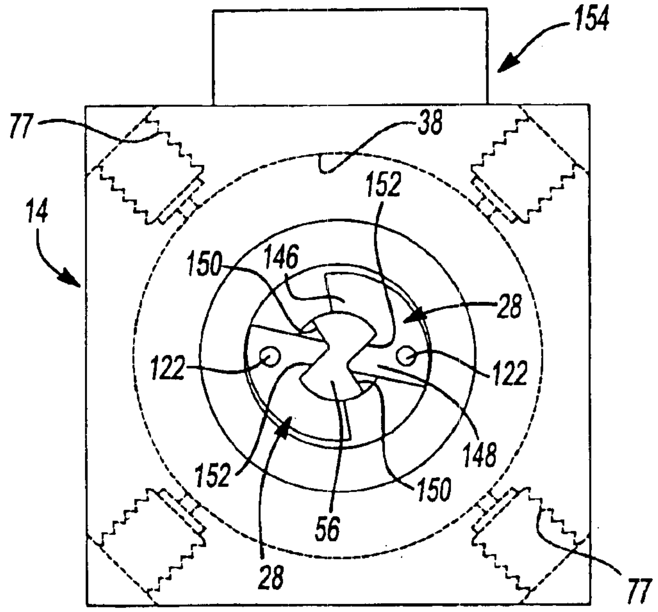
FIG. 7 is a partial top view depicting the location of the clamping members when in the retracted position.

As best shown in FIGS. 6 and 7, each clamping member 28 includes an arcuate arm portion 146 and a dog 148. Each flute 128 includes a first face 150 and a second face 152 selectively engageable with dog 148. During movement of actuator assembly from the retracted position to the extended position, cam rod 56 rotates to cause first face 150 to engage dog 148. Based on the positioning of pin 122 relative to cam rod 56, a torque is applied to each clamping member 28 to cause clamping members to retract within locating pin 62 toward the first position. The retracted or first position is depicted in FIG. 7. When actuator assembly 24 is moved from the extended position toward the retracted position, cam rod 56 rotates to place second face 152 in contact with dog 148. This motion imparts a torque to each clamping member 28 to cause arcuate arm portion 146 to extend outwardly beyond external surface 32 and place the clamping member in the second position as shown in FIG.

6. Locking pin assembly 26 translates to draw clamping member 28 into contact with workpiece 12.

Serpentine slot 124 is shaped to include a substantially straight longitudinally extending section 153. Drive pin 58 is positioned in section 153 when actuator assembly 24 is in the fully retracted position. At this time, clamping members 28 are in their second or extended positions. If a loss of pressurized fluid should occur, clamping members 28 will be retained in the second position because cam rod 56 is restricted from rotation due to the positioning of drive pin 58 in longitudinally extending section 153 as previously described. If an operator wishes to move clamping member 28 from their second positions to their first positions without the aid of pressurized fluid, locating pin 62 is manually drawn toward the extended position. Locating pin 62 includes an aperture 155 for receipt of a tool to assist the operator in translating actuator assembly 24 toward the extended position. As the operator causes the actuator assembly to move, cam rod 56 rotates to cause each arcuate arm portion 146 to retract beneath external surface 32. At this time, workpiece 12 may be removed from clamp 10.

FIG. 4 shows an alternate retention device to maintain force on workpiece 12 should pressurized fluid become unavailable. Optional spring 157 (shown in broken lines) biasedly urges actuator assembly 24 toward the fully retracted position. Clamping members 28 remain in their second positions and are urged into contact workpiece 12. The force provided by spring 157 may be overcome by an operator manually moving actuator assembly 24 toward the extended position as previously described.

A proximity switch assembly 154 is configured to signal an electronic controller (not shown) or a user when piston 52 is located near the top or bottom of first bore portion 38. More particularly proximity switch assembly 154 includes a housing 156, an access plate 158, a first sensor head 160, a second sensor head 162 and wire 164 interconnecting the sensor heads and housing 156. First sensor head 162 is positioned within a first transverse bore 166. First transverse bore 166 extends from first bore portion 38 to a switch pocket 168 formed in body 14. Second sensor head 162 is positioned within a second transverse bore 170. Second transverse bore 170 is in communication with first bore portion 38 and pocket 168. First sensor head 160 and second sensor head 162 are positioned to detect the presence or absence of piston 52. Each sensor head outputs a signal when the piston is within a predetermined proximity of an end face of the sensor head. In this manner, a controller or an operator is notified that clamping member 28 is in the first position, second position or somewhere therebetween depending on the signals output from proximity switch assembly 154.

Figure 8:
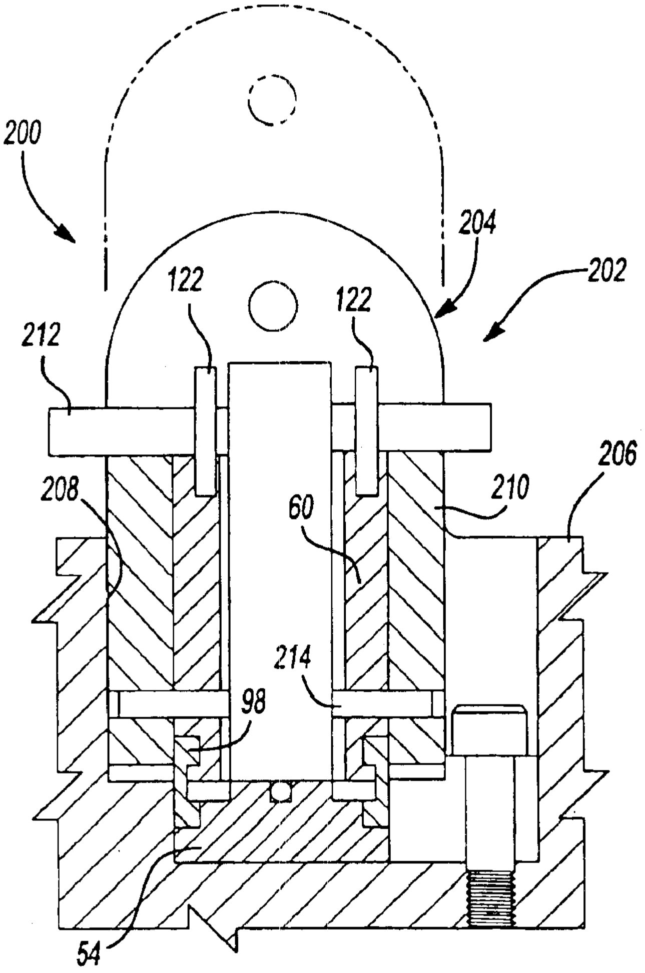
FIG. 8 is a partial cross-sectional view depicting an alternate embodiment sealed pin locating clamping apparatus.

FIG. 8 depicts an alternate embodiment sealed pin locating and clamping apparatus 200. Clamp 200 is substantially similar to clamp 10. Accordingly, like elements will retain their reference numerals as previously introduced. Clamp 200 includes a locating pin assembly 202 including an enlarged locating pin 204. Enlarged locating pin assembly 202 is used in conjunction with piston rod 54, cam rod 56 and keepers 98. A modified support 206 includes an enlarged bore 208 for receipt of the differently sized components. A sleeve 210 fills the gap between the increased size bore 208 and extension tube 60. Enlarged clamping members 212 pivot about pins 122. A pair of pin retainers 214 interconnect sleeve 210 to extension tube 60 and locating pin 204. By constructing clamps 10 and 200 in this manner, one skilled in the art will appreciate that any number of differently sized pins may be used with a common clamp body and actuator assembly.

It should be appreciated that the embodiment shown is merely exemplary in nature and that a number of variations may be made without departing from the scope of the present invention. Specifically, the actuator may include an electric motor in lieu of the piston arrangement depicted. Additionally, functioning embodiments of the clamp need not include an actuator assembly including a serviceable subassembly. Therefore, the clamp could be further simplified by reducing the number of components required.

What is claimed is:

1. A clamp comprising:

a body;

a locating pin having a longitudinal axis, said locating pin being coupled to said body;

a clamping arm rotatable about an axis substantially parallel to said longitudinal axis; and an actuator movably supported by said body, said actuator being axially moveable between a retracted position and an extended position, said actuator including a cam rod drivingly coupled to said clamping arm, wherein said cam rod rotates about said longitudinal axis in response to axial movement of said actuator, said clamping arm being moveable between a first position substantially beneath an exterior surface of said locating pin and a second position at least partially extending beyond said exterior surface.

2. The clamp of claim 1 further including a drive pin fixed to said body, said drive pin being slidingly positioned within a slot of said cam rod.

3. The clamp of claim 2 wherein said locating pin axially translates with said actuator.

4. The clamp of claim 3 wherein said actuator includes a piston slidably positioned within a bore of said body.

5. The clamp of claim 1 wherein said actuator includes an outer rod having a bore, said cam rod being rotatably supported within said bore.

6. The clamp of claim 5 further including a key slidably positioned within a keyway of said outer rod to prevent rotation of said outer rod relative to said body.

7. The clamp of claim 1 further including a second clamping arm rotatable about a second axis offset from and substantially parallel to said axis.

8. The clamp of claim 7 wherein said cam rod includes a first region selectively engaging said clamping arm and a separate second region selectively engaging said second clamping arm.

9. The clamp of claim 8 wherein said first and second regions are substantially diametrically opposed.

10. The clamp of claim 1 wherein said clamp rod is restricted from rotation when said actuator is in said retracted position to maintain the location of said clamping member in said second position.

11. A clamp comprising:

a body;

an actuator moveably supported by said body, said actuator including a first rod having an internal cavity and a second rod rotatably positioned within said internal cavity;

a pin mounted to said body, a portion of said pin being positioned within a cam slot formed in said second rod; and a clamping member drivingly coupled to said actuator, wherein said second rod rotates in response to linear movement of said first rod to position said clamping member.

12. The clamp of claim 11 wherein said first rod includes separable sections.

13. The clamp of claim 12 wherein said first rod includes first, second and third sections, said first section having a bulbous end and a hollow sleeve, said hollow sleeve being positioned within and coupled to said second section.

14. The clamp of claim 13 wherein said third section includes a bore and is coupled to said second section, a portion of said second rod being positioned within said bore.

15. The clamp of claim 13 wherein a portion of said second rod is positioned within said hollow sleeve.

16. The clamp of claim 12 further including a support coupled to said body, said support including a bore extending therethrough, portions of said first rod and said second rod being positioned in said bore, wherein said support encloses a fastener interconnecting two of said separable sections.

17. The clamp of claim 11 wherein said clamping member is positioned within a transversely extending slot formed in said first rod.

18. The clamp of claim 17 wherein said clamping member is selectively positionable to at least partially protrude from said transversely extending slot.

19. The clamp of claim 18 wherein said second rod includes a face selectively, engageable with a dog extending from said clamping member, said second rod operable to impart a torque to said clamping member.

20. The clamp of claim 11 further including a support coupled to said body, said support including a bore extending therethrough, portions of said first rod and said second rod being positioned in said bore.

21. The clamp of claim 20 wherein said support is selectively removable from said clamp to allow access to said first rod.

22. A method of operating a clamp including a body, an actuator moveably supported by the body, and a clamping member, the actuator having first and second rods where the second rod is rotatably positioned with a cavity of the first rod, the method comprising:

linearly translating the actuator;

rotating the second rod relative to the first rod;

drivingly engaging a portion of the clamping member with the second rod; and moving the clamping member between first and second positions, where the step of moving the clamping member includes rotating the clamping member about an axis offset from and substantially parallel to an axis on which the actuator is translated.

23. The method of claim 22 further including extending a portion of the clamping member beyond an external surface of the first rod when the clamping member is in the second position.

* * * * *